United States Patent
Aggarwal et al.

(10) Patent No.: US 11,222,323 B2
(45) Date of Patent: Jan. 11, 2022

(54) SYSTEM AND METHOD FOR SOFTWARE ALLOCATION BASED ON FORECASTS AND CALENDARS

(71) Applicant: International Business Machines Corporation, Armonk, NY (US)

(72) Inventors: Vijay K. Aggarwal, Austin, TX (US); Lorraine M. Herger, Port Chester, NY (US); Matthew A. McCarthy, Holly Springs, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 16/703,199

(22) Filed: Dec. 4, 2019

(65) Prior Publication Data

US 2020/0104818 A1     Apr. 2, 2020

Related U.S. Application Data

(62) Division of application No. 13/586,242, filed on Aug. 15, 2012, now Pat. No. 10,592,887.

(51) Int. Cl.
*G06Q 20/22*     (2012.01)
*G06F 21/00*     (2013.01)
*G06Q 10/06*     (2012.01)

(52) U.S. Cl.
CPC ............ *G06Q 20/22* (2013.01); *G06F 21/00* (2013.01); *G06Q 10/06* (2013.01)

(58) Field of Classification Search
None
See application file for complete search history.

(56) References Cited

U.S. PATENT DOCUMENTS

| 5,742,757 A | 4/1998 | Hamadani et al. |
| 5,845,065 A | 12/1998 | Conte et al. |

(Continued)

FOREIGN PATENT DOCUMENTS

| JP | 08-063417 | 3/1996 |
| JP | 08-305560 | 11/1996 |

(Continued)

OTHER PUBLICATIONS

J. K. Hollingsworth and S. Maneewongvatana, "Imprecise calendars: an approach to scheduling computational grids," Proceedings. 19th IEEE International Conference on Distributed Computing Systems (Cat. No. 99CB37003), 1999, pp. 352-359, doi: 10.1109/ICDCS.1999.776537. (Year: 1999).*

(Continued)

*Primary Examiner* — Jacob C. Coppola
*Assistant Examiner* — Eduardo Castilho
(74) *Attorney, Agent, or Firm* — Samuel A. Waldbaum

(57) ABSTRACT

Systems and methods provide at least one software application to users from a software monitor computer server. The software application requires a license grant for use. The software monitor computer server tracks usage of the software application to develop historical use patterns. The software monitor computer server also receives calendar input from electronic calendars of the users and analyzing the calendar input to identify future calendared uses of the software application. This allows the software monitor computer server to predict the future license grant needs of the software application based on the historical use patterns and the future calendared uses of the software application. The software monitor computer server also provides substitute software applications to the users when an insufficient number of license grants are available to meet the future calendared uses of the software application.

14 Claims, 8 Drawing Sheets

(56) References Cited

U.S. PATENT DOCUMENTS

| | | | |
|---|---|---|---|
| 5,892,900 A * | 4/1999 | Ginter | G06Q 20/12 |
| | | | 726/26 |
| 7,426,485 B1 * | 9/2008 | Lobo | G06Q 30/0603 |
| | | | 705/28 |
| 7,457,781 B1 * | 11/2008 | Weaver | G06Q 20/367 |
| | | | 455/405 |
| 7,831,457 B2 | 11/2010 | Varadarajan et al. | |
| 10,592,887 B2 | 3/2020 | Aggarwal | |
| 2001/0011253 A1 | 8/2001 | Coley et al. | |
| 2004/0010440 A1 * | 1/2004 | Lenard | G06F 21/105 |
| | | | 705/59 |
| 2004/0064585 A1 | 4/2004 | Doss et al. | |
| 2004/0260589 A1 | 12/2004 | Varadarajan et al. | |
| 2005/0028153 A1 | 2/2005 | Anderson | |
| 2005/0049973 A1 | 3/2005 | Read et al. | |
| 2005/0283782 A1 * | 12/2005 | Lu | G06F 9/5072 |
| | | | 718/100 |
| 2006/0069686 A1 * | 3/2006 | Beyda | G06Q 10/109 |
| 2007/0043831 A1 * | 2/2007 | Kessler | H04L 67/34 |
| | | | 709/219 |
| 2007/0260989 A1 | 11/2007 | Vakil et al. | |
| 2008/0120619 A1 * | 5/2008 | Podila | G06Q 10/10 |
| | | | 718/102 |
| 2008/0243699 A1 * | 10/2008 | Hilerio | G06F 21/105 |
| | | | 705/59 |
| 2008/0306786 A1 | 12/2008 | Lonowski et al. | |
| 2009/0024712 A1 | 1/2009 | Weiss et al. | |
| 2009/0029692 A1 * | 1/2009 | Radermacher | H04L 67/306 |
| | | | 455/418 |
| 2009/0154367 A1 * | 6/2009 | Aaron | H04W 64/006 |
| | | | 370/252 |
| 2012/0192016 A1 | 7/2012 | Gotesdyner et al. | |
| 2012/0278129 A1 * | 11/2012 | Salomatin | G06Q 30/0241 |
| | | | 705/7.31 |
| 2013/0198029 A1 | 8/2013 | Mowatt et al. | |
| 2014/0052610 A1 | 2/2014 | Aggarwal | |

FOREIGN PATENT DOCUMENTS

| | | |
|---|---|---|
| JP | 2001-100989 | 4/2001 |
| JP | 2001-216174 | 8/2001 |
| JP | 2008-204042 | 9/2008 |
| WO | 2014028226 A2 | 2/2014 |

OTHER PUBLICATIONS

L. Markov, "Two stage optimization of job scheduling and assignment in heterogeneous compute farms," Proceedings. 10th IEEE International Workshop on Future Trends of Distributed Computing Systems, 2004. FTDCS 2004., 2004, pp. 119-124, doi: 10.1109/FTDCS.2004.1316602. (Year: 2004).*

P. Anthony and O. Y. Wooi, "Calendar agent with commonsense reasoning," 2011 Malaysian Conference in Software Engineering, 2011, pp. 399-403, doi: 10.1109/MySEC.2011.6140705. (Year: 2011).* http://www.altera.com/download/licensing/setup/lic-setup-float-unix.html, Jul. 31, 2012., pp. 1-2.

http://en.wikipedia.org/wiki/Predictive_modelling, Jul. 31, 2012, pp. 1-4.

http://en.wikipedia.org/wiki/Logistic_regression, Jul. 31, 2012, pp. 1-16.

http://en.wikipedia.org/wiki/Probit_model, Jul. 31, 2012, pp. 1-5.

International Application No. PCT/US2013/053173, Notification Concerning Transmittal of International Preliminary Report on Patentability dated Feb. 26, 2015, pp. 1-10.

PCT/US2013/053173, Written Opinion and International Search Report, dated Mar. 19, 2014, pp. 1-13.

U.S. Appl. No. 13/586,242, Restriction Requirement dated Jul. 25, 2014, pp. 1-7.

U.S. Appl. No. 13/586,242, Office Action Communication dated Aug. 13, 2014, pp. 1-21.

U.S. Appl. No. 13/586,242, Office Action Communication dated Jan. 29, 2015, pp. 1-26.

U.S. Appl. No. 13/586,242, Advisory Action dated Mar. 23, 2015, pp. 1-8.

U.S. Appl. No. 13/586,242, Office Action Communication dated Feb. 4, 2016, pp. 1-22.

U.S. Appl. No. 13/586,242, Office Action Communication dated Aug. 2, 2016, pp. 1-26.

U.S. Appl. No. 13/586,242, Office Action Communication dated May 24, 2017, pp. 1-27.

U.S. Appl. No. 13/586,242, Office Action Communication dated Nov. 16, 2017, pp. 1-40.

U.S. Appl. No. 13/586,242, Advisory Action dated Feb. 16, 2018, pp. 1-2.

U.S. Appl. No. 13/586,242, Board's Decision dated Oct. 22, 2019, pp. 1-12.

U.S. Appl. No. 13/586,242, Notice of Allowance dated Nov. 6, 2019, pp. 1-10.

IBM: List of IBM Patents or Patent Applications Treated as Related (Appendix P), Feb. 28, 2020, 2 pages.

International Application No. PCT/US2013/053173, Notification Concerning Transmittal of International Preliminary Report on Patentability dated Feb. 26, 2015, 10 pages.

* cited by examiner

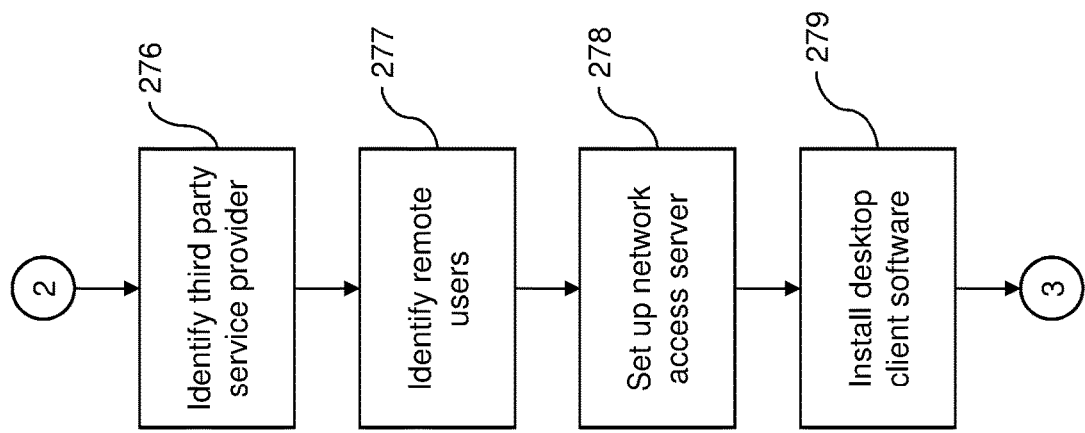

SYSTEM AND METHOD FOR SOFTWARE ALLOCATION BASED ON FORECASTS AND CALENDARS

CROSS-REFERENCE TO RELATED APPLICATIONS

The present invention claims the benefit under 35 U.S.C. § 120 as a divisional of presently pending U.S. patent application Ser. No. 13/586,242 filed on Aug. 15, 2012, the entire teachings of which are incorporated herein by reference.

BACKGROUND

The present disclosure relates to properly obtaining software licenses, and more particularly to systems and methods that predict software license needs based upon historical usage and planned usage of software applications.

Software licensing approaches have been established in which a limited number of licenses for a software application are shared among a larger number of users over time. Each software license is different from the next; however, many floating licenses allow a specific number of simultaneous users to have access to an application. If a software monitor server does not have a sufficient number of licenses, some users may be denied access to the software application during peak usage. Some licenses can be provided for no monetary charge; however, many require some type of fee (monetary or otherwise) for each simultaneous user. Understandably, the number of licenses obtained is kept as low as possible to save licensing fees/costs. Therefore, the competition between the cost of obtaining additional licenses and the need to have a sufficient number of licenses to handle all requests during peak usage presents a difficult management situation.

SUMMARY

One exemplary method herein provides at least one software application to users from a server that is sometimes referred to herein as a software monitor computer server. The software application requires a license grant for use. The software monitor computer server tracks usage of the software application to develop historical use patterns. The software monitor computer server also receives calendar input from electronic calendars of the users and analyzes the calendar input to identify future calendared uses of the software application. This allows the software monitor computer server to predict the future license grant needs of the software application based on the historical use patterns and the future calendared uses of the software application.

Another method herein similarly provides at least one software application to users from a software monitor computer server. The software application again requires a license grant for use. The software monitor computer server tracks usage of the software application to develop historical use patterns. The software monitor computer server also receives calendar input from electronic calendars of the users and analyzes the calendar input to identify future calendared uses of the software application. This allows the software monitor computer server to predict the future license grant needs of the software application based on the historical use patterns and the future calendared uses of the software application. The software monitor computer server also provides substitute software applications to the users when an insufficient number of license grants are available to meet the future calendared uses of the software application.

The software monitor computer server obtains the number of license grants for the software application corresponding to the future license grant needs. More specifically, the software monitor computer server obtains the number of license grants for the software application corresponding to the maximum number of users predicted to simultaneously use the software application, based on the future license grant needs. These future license grant needs form a schedule of future times and dates when the users are predicted to use the software application. When obtaining the license grants, the method provides a form of payment to a software vendor for the license grants. The users are computerized devices operated by different individuals, are separate from the software monitor computer server, and are operatively connected (directly or indirectly connected) to the software monitor computer server.

Another method herein provides a software application to users from a software monitor computer server. The software application requires a license grant for use. The software monitor computer server tracks usage of the software application to develop historical use patterns and tracks network communication speeds of a network connecting the software monitor computer server and the users to develop historical network speed patterns. The software monitor computer server receives calendar input from electronic calendars of the users and analyzes the calendar input to identify future calendared uses of the software application. The software monitor computer server analyzes the historical network speed patterns to predict future network speed patterns and adjusts the future calendared uses to accommodate the predicted network speed patterns to produce adjusted future calendared uses. The software monitor computer server predicts the future license grant needs of the software application based on the historical use patterns and the adjusted future calendared uses of the software application.

BRIEF DESCRIPTION OF THE DRAWINGS

The embodiments herein will be better understood from the following detailed description with reference to the drawings, which are not necessarily drawing to scale and in which:

FIG. 8 is a schematic diagram of a virtual private network system according to embodiments herein.

DETAILED DESCRIPTION

Figure 1:
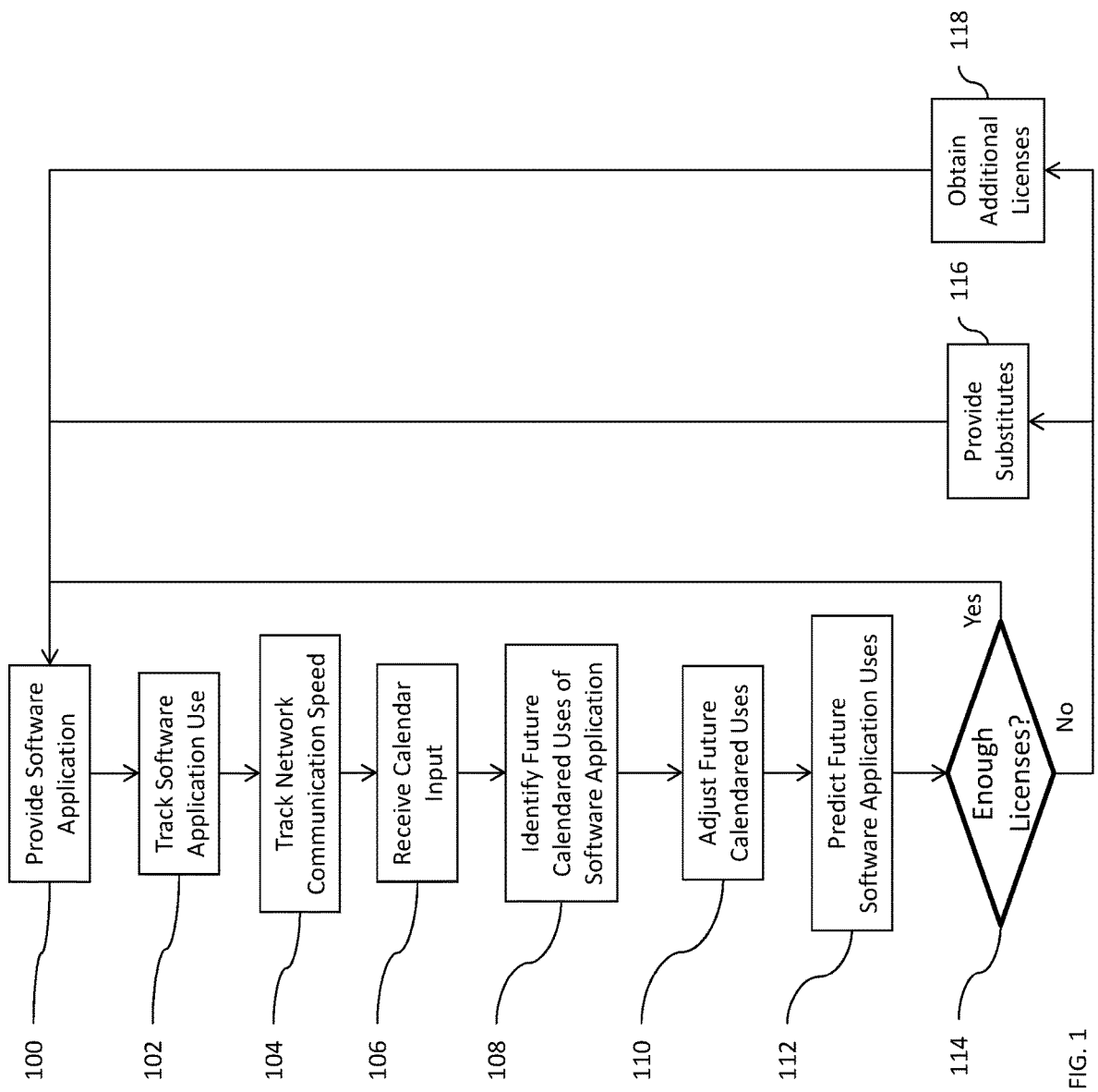
FIG. 1 is a flow diagram illustrating embodiments herein.

The software license management systems and methods herein integrate features and capabilities from asset management, collaboration, and analytics to optimize the utilization of licensed software assets to provide users real-time information about software usage and license usage. Such systems and methods enable users to more efficiently obtain software and plan software use in a constrained environment.

The systems and methods herein detect when a software product is available for use (because it is no longer in use by another user) and predict usage. The systems and methods can make use of a monitor server and a probabilistic engine to determine likelihood of software availability for time period based on various criteria. This kind of "forecast" is useful to efficiently make use of software. The license use prediction herein can be based on historical usage patterns for classes of users, as well as prediction based on time, day, and a connection to a set of users' online calendars.

The systems and methods herein provide a learning module that learns to make forecasts by an analysis of particular clusters of users, as well as the automated license purchasing based on the learning module. In some embodiments, a connection to one or more users' online calendars helps facilitate the process. Also of note is the creation and delivery of a "use plan" to help users plan future use of software, with the system suggesting possible similar tools that a user may be able to use as substitute. Further, a consideration of network speed in determining the use plan helps make the software use more accurate.

In one example, a user may make a request of software monitor server (SMS, which is sometimes referred to herein as a software monitor computer server). The SMS determines current and predicted availability of software, and provides software or indicates the status of predicted software usage (e.g., a user is currently using the software that it is needed by another user). An automated license purchase can be made when needed. Also, the "use plan" is generated, giving the user guidance as to when to use the requested software, or when to use substitute software with similar characteristics Thus, the SMS may make and provide predictions with respect to software availability. For example, the system may determine that from 10:00-11:00, 20 licenses are usually in use for software product A, but at 12:00-1:00 only 2 licenses are usually in use. Based on such information, and other information (e.g. day of the week, month, holiday, weather forecast, on-line calendar of user, geographic location, speed of connections (writing out data over distance may necessitate the licenses being held for a longer period of time, etc.)), the SMS may notify one or more users of the full availability (or limited availability) of a software application, or of the requirement to use substitute software applications if there is or will be no availability. Note, that the speed of connections is used to make the prediction more accurate. If data, software, graphics, or other network-intensive information needs to be transmitted, licenses may need to be held for a longer period of time than a user may initially request. For example, a user may believe she needs the software from 3:00-4:00, but the system may automatically add a scheduled time "buffer" (e.g. 2:45-4:15) to this because network traffic is expected to be high at this time.

The systems and methods herein learn to make forecasts by an analysis of previous software use by: a group, a cluster of users, users in a company. The determination of which users to include in such forecasts can be made by many processes (e.g., history of use, sign-up information for future use, a real-time detection of current use, and how often a user's sign-up information is wrong, that is, a user may often sign up to use software, but the software is not actually used.)

As shown above, automated license purchasing decisions may be made. For example, if the on-line calendar of five potential users shows that these users are on vacation or in meetings for a time period T, it is likely that no more licenses are needed for time period T. However, in certain circumstances, the SMS may determine that more licenses need to be obtained and may send a signal to a purchasing module to initiate a purchase. Since purchases may not always be instantaneous. Thus, the forecasts and predictive elements herein have additional utility so that purchase decisions are not made "at the last minute" when any delays could be detrimental to a product schedule plan.

Further, with systems and methods herein, potential users may receive information, including: likelihood of availability in time period T, a suggest "use plan" in which a user receives helpful information as to how to plan his or her use of the software, and the probability of use of similar tools that a user may be able to use as substitute software for a time period T. The use plan may take the form of a document or related means of information conveyance. For example, a use plan may be written advice as to best times for users to use tools and/or substitute tools.

In addition, aspects of the systems and methods herein may ask users to free up their use of software based on many criteria. For example, user A may be using software, but no activity may have been detected for 2 hours. In this case, the SMS may gracefully drop user A's use to allow user B to use the software. A record of such "dropping" can be stored in order to help forecast future use in a company.

The systems herein can use a distributed agent program to monitor, collect, and store utilization data for defined 3rd party software licenses. The agent utilization data can be collected by a central application server for further data processing. The application produces measurable patterns of software license utilization over time. From these patterns, the system uses various predictive modeling techniques to accurately forecast demand and availability of shared software licenses.

This forecasting capability is further linked to users of software licenses through collaboration, social networking, and messaging tools to communicate end user demand and facilitate availability planning. Software licenses can be reserved, issued, and returned to inventory based on the integrated messaging and collaboration tools using intelligent prompts and enforceable policy logic. For example, instant messaging tools can be used to enable a user to manage reservations through a messaging service, used to notify a user to release the software because the user is not really using the software; a user may be able to use a substitute application (i.e., an older version of the software product); a user can receive a summary of utilization for products they have used; etc.

Thus, the systems and methods herein couple to one or more users' online calendars to help facilitate automated planning of software use, provide automated suggestion of possible similar tools that a user may be able to use as substitute, utilize the history of network speeds to determine an optimal software allocation period and schedule (writing out data over distances may necessitate the licenses being held for a longer period of time, etc.), etc.

Figure 2:
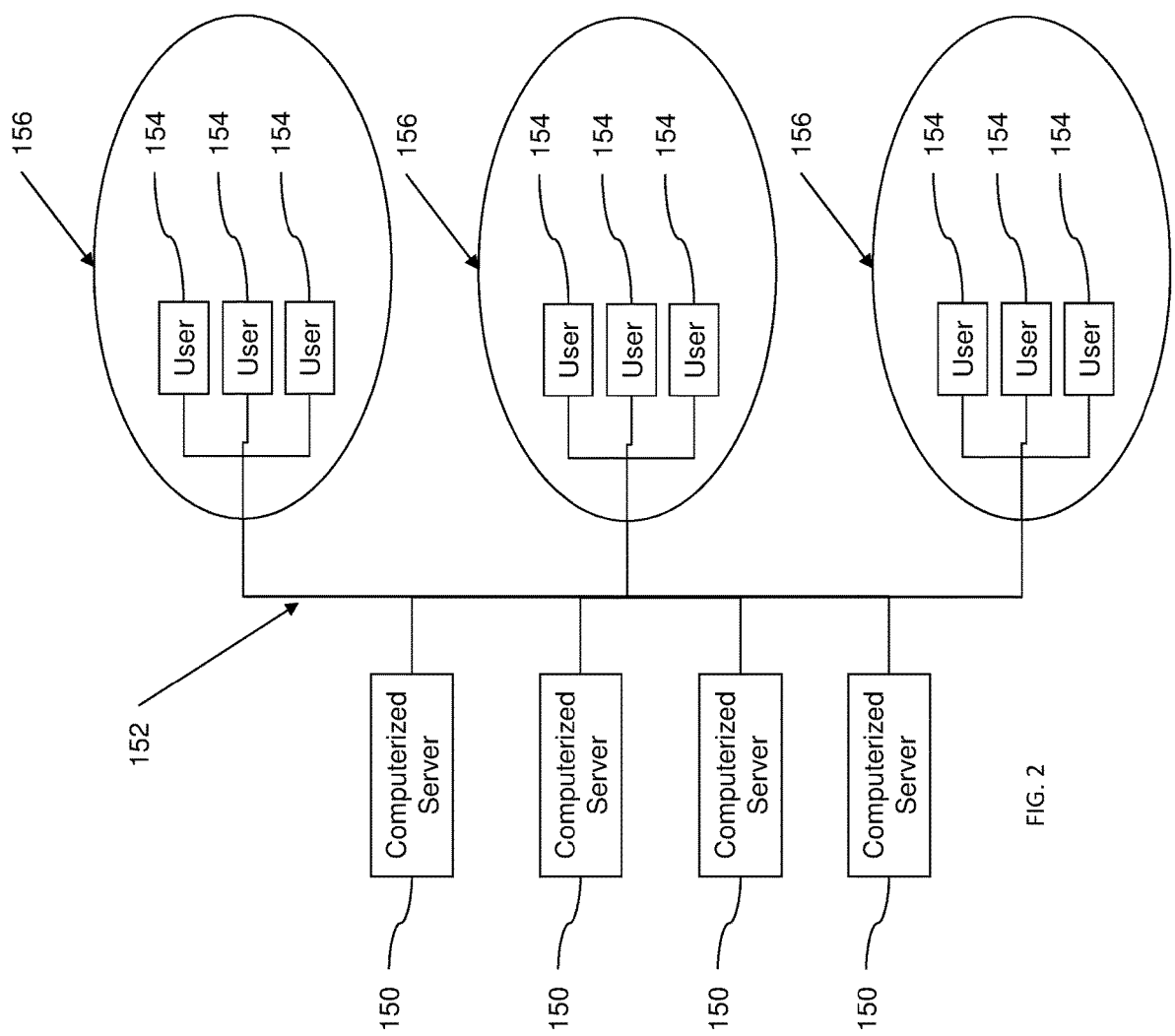
FIG. 2 is a schematic diagram of a hardware system according to embodiments herein.

One exemplary method shown in flowchart form in FIG. 1 provides a software application to users from a software monitor computer server in item 100. As shown in FIG. 2, the users 154 (which can be classified into different groups or organizations 156 according to many different classification schemes) can be computerized devices operated by different individuals, are separate from the software monitor computer server(s) 150, and are operatively connected (directly or indirectly connected) to the software monitor computer server(s) 150 by one or more (wired or wireless, local area or wide area) computer networks 152.

The software application requires a license grant for each simultaneous use. Generally, software licenses require that each user have a license, or licenses can be shared between users. Therefore, if ten users are simultaneously using a specific software application, the software monitor server is required to have ten licenses. The licenses can be leased or can be permanently acquired. When obtaining the license grants, the method can optionally provide payment of some form of compensation (which may be monetary or non-monetary) to a software vendor for the license grants.

The software monitor computer server tracks usage of the software application to develop historical use patterns in item 102. Therefore, the historical number of simultaneous users (which may be classified according to group) at certain times and certain days is used to forecast the number of simultaneous users there will be at similar times and days.

Further, the software monitor computer server tracks network communication speeds of a network connecting the software monitor computer server and the users to develop historical network speed patterns in item 104. Therefore, the historical network communication speed at certain times and certain days is used to forecast what the network communication speed will be at similar times and days.

The software monitor computer server receives calendar input from the online or electronic calendars of the users in item 106. For example, a dedicated software application (e.g., an agent) on each user computer (or operatively connected to the online calendars) can identify calendar appointments when a certain software application will be needed (or will not be needed) and supply the same to the software monitor computer server. Users can specify a software application by name in their calendar, or the agent can imply the software application that will be required depending upon the activity description in the calendar, or depending upon the type of file (based on, for example, file extension) that is identified as being needed for the calendar activity or appointment.

The software monitor computer server analyzes the calendar input to identify future calendared uses and non-uses of the software application in item 108. The software monitor computer server also analyzes the historical network speed patterns to predict future network speed patterns and adjusts the future calendared uses to accommodate the predicted network speed patterns to produce adjusted future calendared uses in item 110. Therefore, in item 110, the software monitor computer server can expand the time slot established by the user on their calendar for a certain software application use if the software monitor computer server predicts that the network speed will be slower than average. The time for using the software application is expanded in item 110 because the slower than normal network speed could cause the user to use the software application for a longer time than what the user planned on the calendar.

The software monitor computer server then predicts the future license grant needs of the software application based on the historical use patterns and the adjusted future calendared uses of the software application in item 112. Thus, the future license grant needs form a schedule of future times and dates when the users are predicted use the software application.

In item 114, the software monitor computer server determines whether there are enough licenses to meet the future needs. If there are, processing returns to item 100 to provide the software application to the users when requested. Otherwise, the software monitor computer server provides substitute software applications to the users and/or obtains additional licenses when an insufficient number of license grants are available to meet the future calendared uses of the software application in item 118 before returning to item 100.

For example, if the software monitor computer server determines that there will not be enough licenses (in item 114) for a specific software application that is indicated on a user's calendar and as being needed, the software monitor computer server can ask the user in advance of the calendar appointment whether they could use a substitute software application for which a license is available. This will allow certain users to reply and accept the use of the substitute software application, which may reduce or eliminate number of additional licenses that need to be obtained in item 118. By identifying which users will be using specific software applications in the future (through user identification by way of the user's calendar) the software monitor computer server can make arrangements in advance to help reduce the number of a licenses that need to be obtained.

In item 118, the software monitor computer server obtains the number of license grants for the software application corresponding to the non-substituted future license grant needs. More specifically, the software monitor computer server can obtain the number of license grants for the software application corresponding to the maximum number of users predicted to simultaneously use the software application, based on the future license grant needs found in item 112.

As will be appreciated by one skilled in the art, aspects of the systems and methods herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments herein. It will be understood that each block of the flowchart illustrations and/or two-dimensional block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
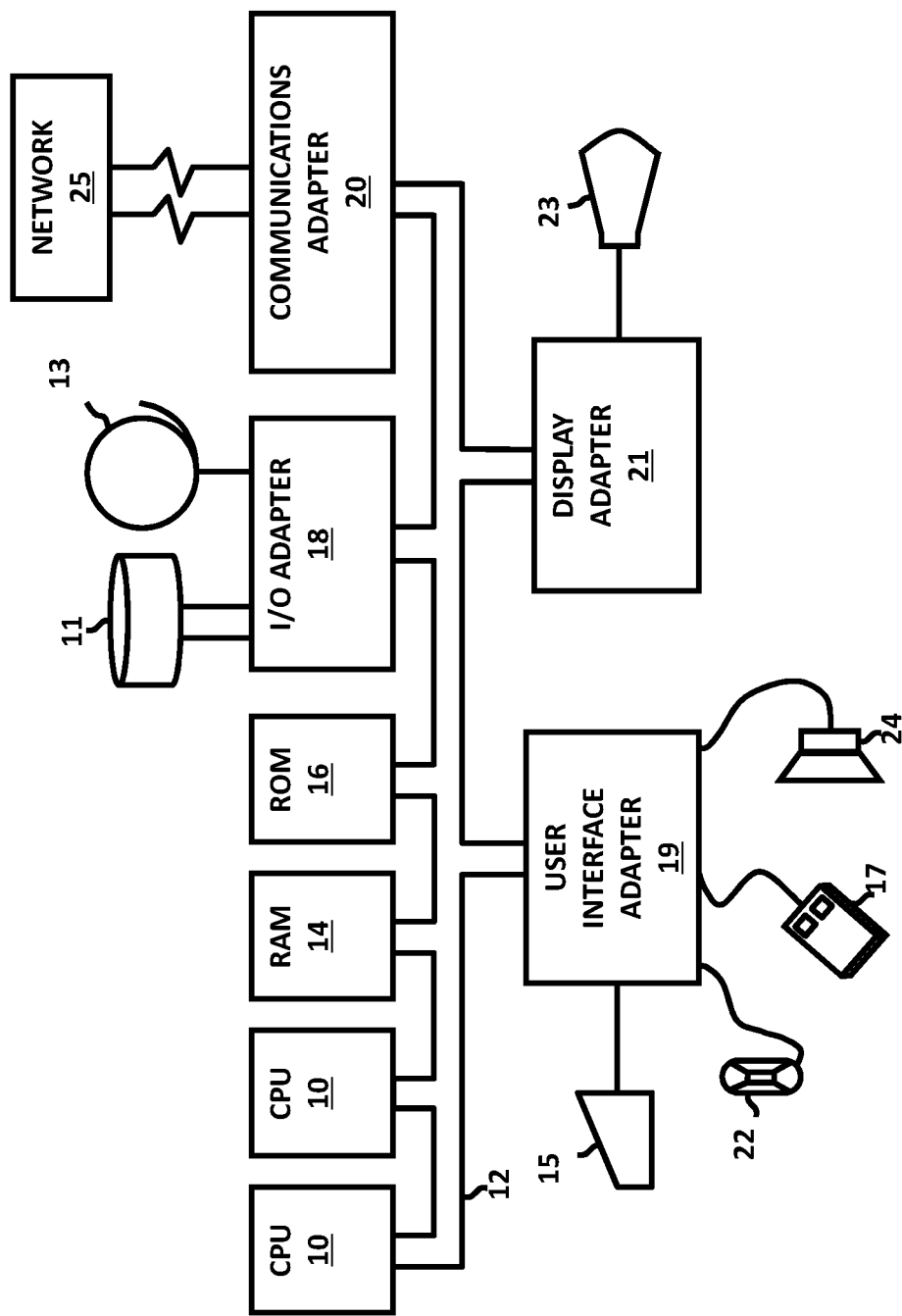
FIG. 3 is a schematic diagram of a hardware system according to embodiments herein.

A representative hardware environment for practicing the embodiments herein is depicted in FIG. 3. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment types include loading directly in the client, server and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. The process software in sent directly to a directory on the client computer hard drive. When there are proxy servers, the process will, select the proxy server code, determine on which computers to place the proxy servers' code, transmit the proxy server code, and then install the proxy server code on the proxy computer. The process software will be transmitted to the proxy server then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Figure 4:
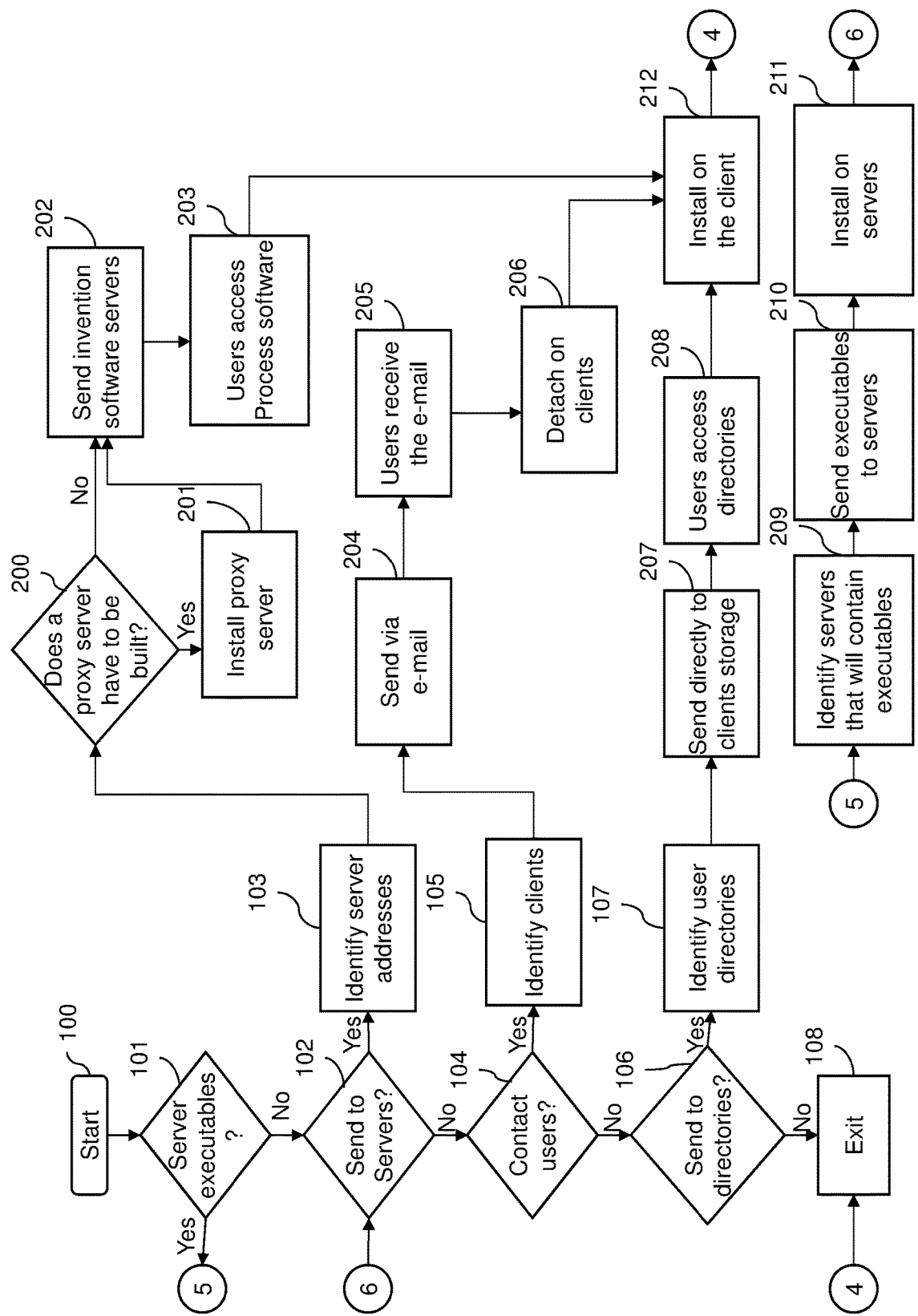
FIG. 4 is a schematic diagram of a deployment system according to embodiments herein.

In FIG. 4, Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying through the use of a shared file system 210. The process software is then installed on the servers 211.

Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail 204 to each of the users' client computers. The users then receive the e-mail 205 and then detach the process software from the e-mail to a directory on their client computers 206. The user executes the program that installs the process software on his client computer 212 then exits the process 108.

Lastly a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 5:
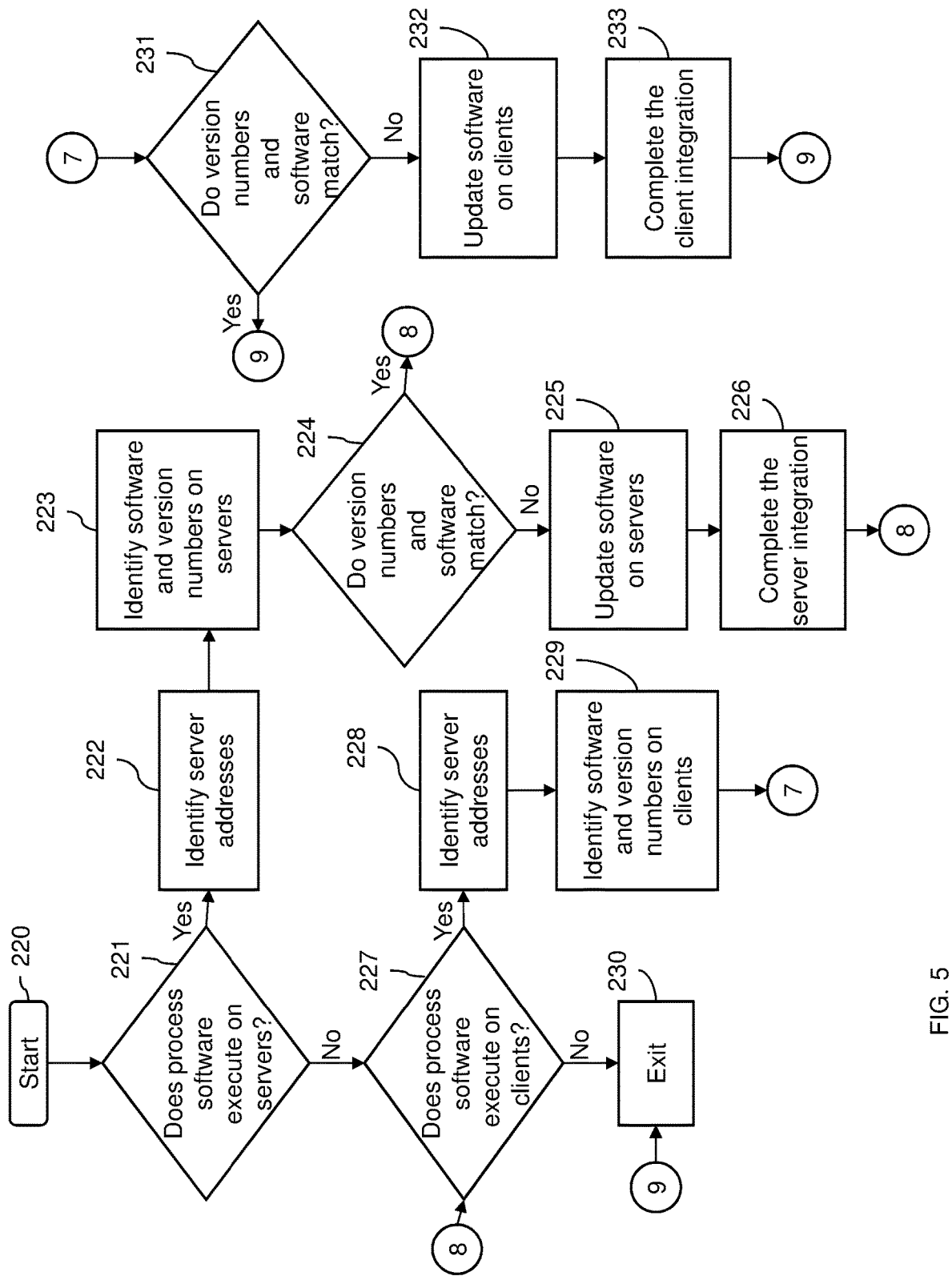
FIG. 5 is a schematic diagram of an integration system according to embodiments herein.

In FIG. 5, Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers, that have been tested with the process software 229. The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6:
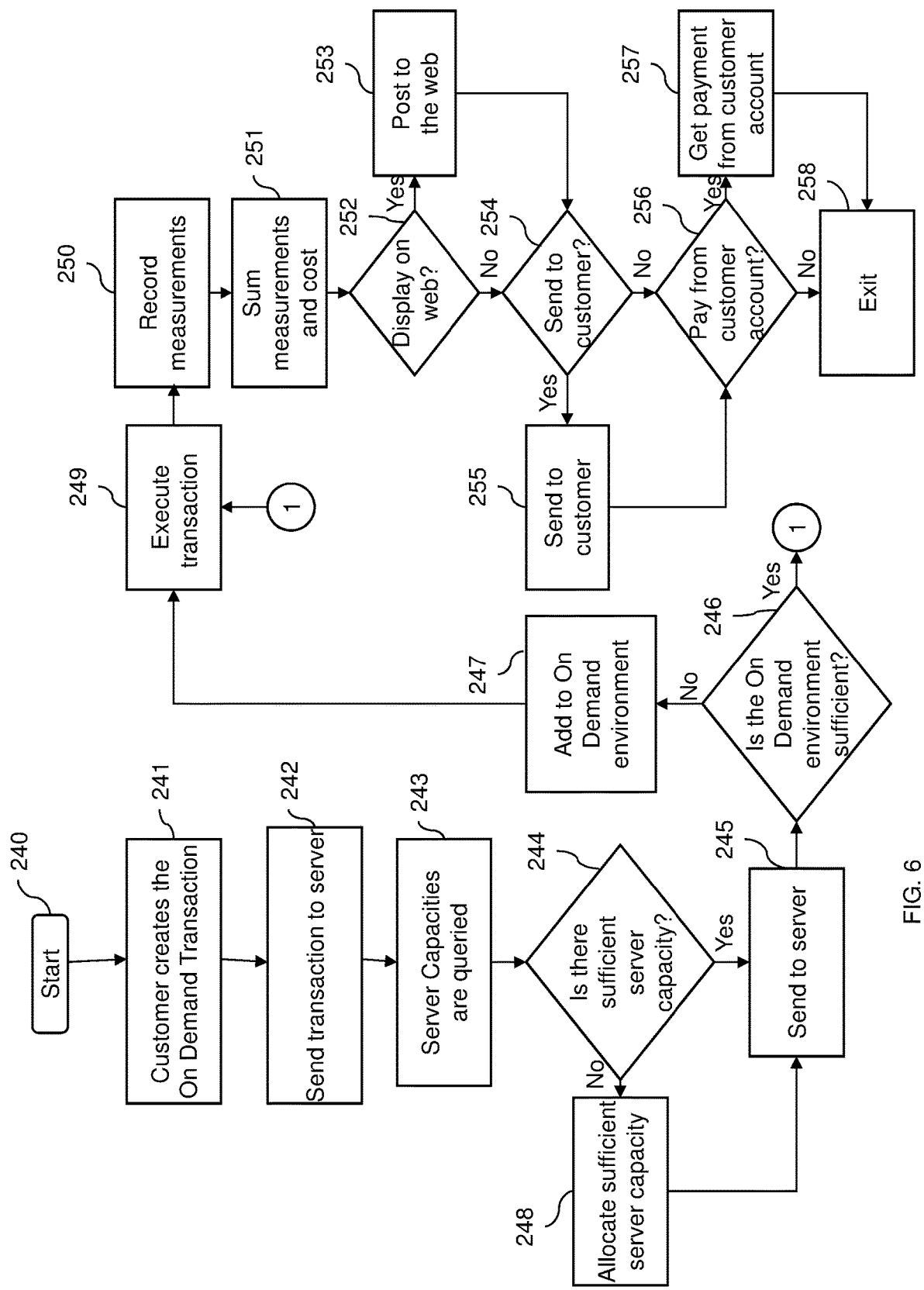
FIG. 6 is a schematic diagram of an on demand system according to embodiments herein.

In FIG. 6, Step 240 begins the On Demand process. A transaction is created than contains the unique customer identification, the requested service type and any service parameters that further specify the type of service 241. The transaction is then sent to the main server 242. In an On Demand environment the main server can initially be the only server, then as capacity is consumed other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next, the required software to process the transaction is accessed, loaded into memory, then the transaction is executed 249.

The usage measurements are recorded 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is to exit the On Demand process 258.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 7:
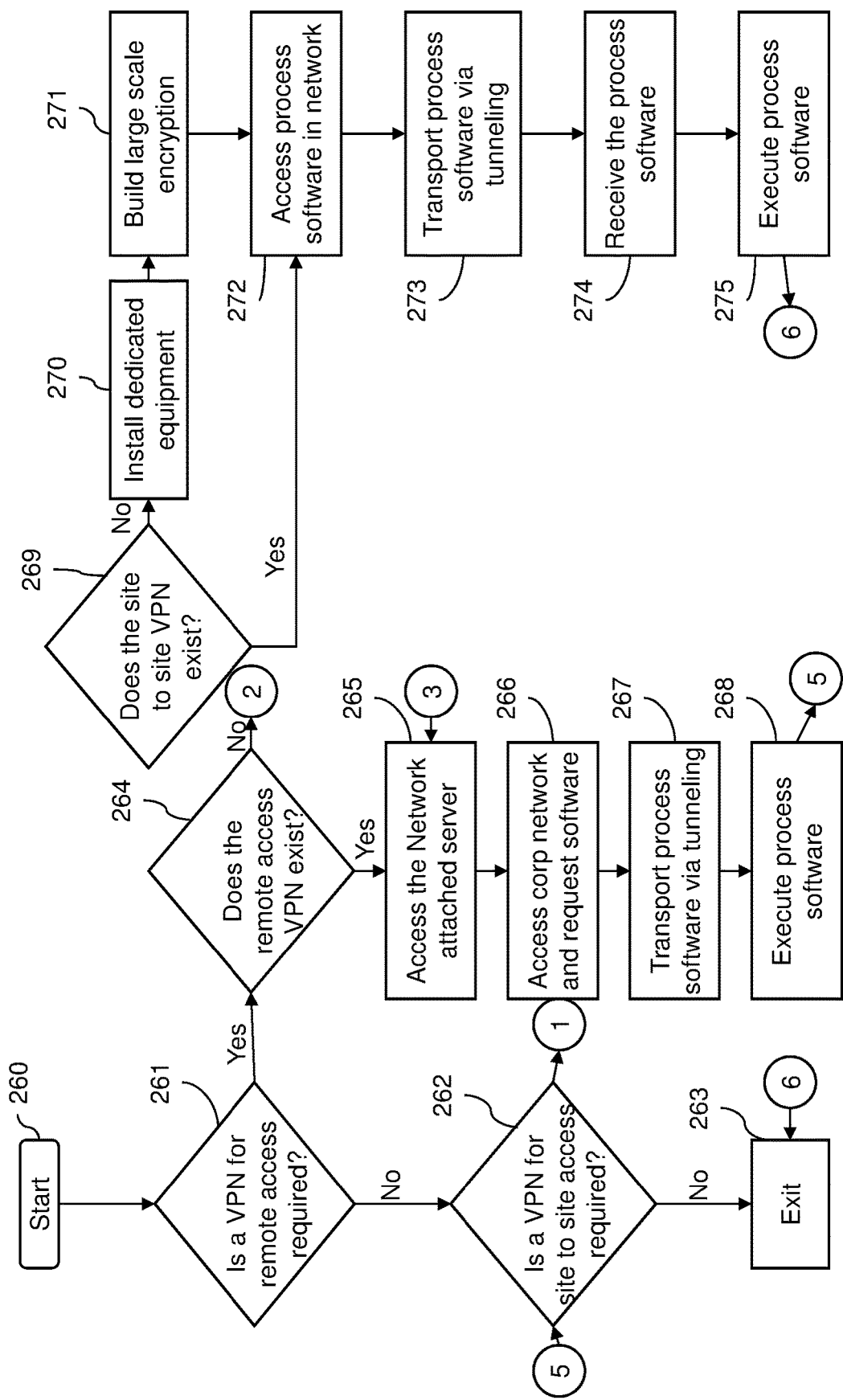
FIG. 7 is a schematic diagram of a virtual private network system according to embodiments herein.

In FIGS. 7 and 8, Step 260 begins the Virtual Private Network (VPN) process. A determination is made to see if a VPN for remote access is required 261. If it is not required, then proceed to 262. If it is required, then determine if the remote access VPN exists 264.

If it does exist, then proceed to 265. Otherwise, identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built, or if it been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271.

After the site to site VPN has been built or if it had been previously established, the users access the process software via the VPN 272. The process software is transported to the site users over the network via tunneling 273. That is the process software is divided into packets and each packet including the data and protocol is placed within another packet 274. When the process software arrives at the remote user's desktop, it is removed from the packets, reconstituted and on the site user's desktop 275. Proceed to exit the process 263.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
providing a software application to users, wherein the software application is provided from a software monitor computer server, said software application requiring a license grant for use;
tracking, by said software monitor computer server, usage of said software application to collect historical use patterns;
tracking, by said software monitor computer server, network communication speeds of a network connecting said software monitor computer server and said users to collect historical network speed patterns;
receiving, by said software monitor computer server, calendar input from electronic calendars of said users;
analyzing, by said software monitor computer server, said calendar input to identify at least one future calendared use of said software application;
analyzing, by said software monitor computer server, said historical network speed patterns to predict future network speed patterns;
adjusting at least one parameter associated with said identified future calendared use to accommodate said future network speed patterns to produce adjusted future calendared uses, wherein the adjusted at least one parameter associated with said identified future calendared use includes expanding a time slot for the identified future calendared use; and
predicting, by said software monitor computer server, future license grant needs of said software application based on said historical use patterns and said adjusted future calendared uses of said software application.

2. The method according to claim 1, further comprising obtaining, by said software monitor computer server, a number of license grants for said software application corresponding to said future license grant needs.

3. The method according to claim 1, further comprising obtaining, by said software monitor computer server, a number of license grants for said software application corresponding to a maximum number of users predicted to simultaneously use said software application based on said future license grant needs.

4. The method according to claim 1, said future license grant needs comprising a schedule of future times and dates when said users are predicted use said software application.

5. The method according to claim 1, further comprising obtaining, by said software monitor computer server, a number of license grants for said software application corresponding to said future license grant needs,
said obtaining comprising providing payment to a software vendor for said license grants.

6. The method according to claim 1, said users comprises a plurality of computerized devices separate from said software monitor computer server, wherein each of the plurality of computerized devices is operated by different individuals, said users being operatively connected to said software monitor computer server.

7. The method according to claim 1, further comprising identifying said future calendared uses based on appointments in said electronic calendars that indicate that said software application will be required, said identifying future calendared uses comprises one of: identifying an activity description in said electronic calendars; and identifying the type of file that is used for a calendar activity.

8. A method comprising:
providing a software application to users, wherein the software application is provided from a software monitor computer server, said software application requiring a license grant for use;
tracking, by said software monitor computer server, usage of said software application to collect historical use patterns;
tracking, by said software monitor computer server, network communication speeds of a network connecting said software monitor computer server and said users to collect historical network speed patterns;
receiving, by said software monitor computer server, calendar input from electronic calendars of said users;
analyzing, by said software monitor computer server, said calendar input to identify at least one future calendared use of said software application;
analyzing, by said software monitor computer server, said historical network speed patterns to predict future network speed patterns;
adjusting at least one parameter associated with said identified future calendared uses to accommodate said future network speed patterns to produce adjusted future calendared uses, wherein the adjusted at least one parameter associated with said identified future calendared use includes expanding a time slot for the identified future calendared use;
predicting, by said software monitor computer server, future license grant needs of said software application based on said historical use patterns and said adjusted future calendared uses of said software application; and
providing, by said software monitor computer server, substitute software applications to said users when an insufficient number of license grants are available to meet said future license grant needs of said software application.

9. The method according to claim 8, further comprising obtaining, by said software monitor computer server, a number of license grants for said software application corresponding to said future license grant needs.

10. The method according to claim 8, further comprising obtaining, by said software monitor computer server, a number of license grants for said software application corresponding to a maximum number of users predicted to simultaneously use said software application based on said future license grant needs.

11. The method according to claim 8, said future license grant needs comprising a schedule of future times and dates when said users are predicted use said software application.

12. The method according to claim 8, further comprising obtaining, by said software monitor computer server, a number of license grants for said software application corresponding to said future license grant needs,
said obtaining comprising providing payment to a software vendor for said license grants.

13. The method according to claim 8, said users comprises a plurality of computerized devices separate from said software monitor computer server, wherein each of the plurality of computerized devices is operated by different individuals, said users being operatively connected to said software monitor computer server.

14. The method according to claim 8, further comprising identifying said future calendared uses based on appointments in said electronic calendars that indicate that said software application will be required, said identifying future calendared uses comprises one of: identifying an activity description in said electronic calendars; and identifying the type of file that is used for a calendar activity.

* * * * *